US005972305A

United States Patent [19]

Park et al.

[11] Patent Number: 5,972,305
[45] Date of Patent: Oct. 26, 1999

[54] DIRECT MANUFACTURING METHOD OF HYDROGEN PEROXIDE

[75] Inventors: Sang-Eon Park; Jung Whan Yoo, both of Daejeon; Woo Jin Lee, Seoul; Jong-San Chang, Daejeon; Yong Ki Park, Daejeon; Chul Wee Lee, Daejeon, all of Rep. of Korea

[73] Assignee: Korea Research Institute of Chemical Technology, Rep. of Korea

[21] Appl. No.: 09/161,835

[22] Filed: Sep. 29, 1998

[30] Foreign Application Priority Data

Sep. 30, 1997 [KR] Rep. of Korea ............ 97-50303

[51] Int. Cl.⁶ .................. C01B 15/022; C01B 15/023
[52] U.S. Cl. .................. 423/587; 423/584; 423/588
[58] Field of Search .................. 423/584, 587, 423/588; 502/74

[56] References Cited

U.S. PATENT DOCUMENTS

| | | | |
|---|---|---|---|
| 4,009,252 | 2/1977 | Izumi et al. | 423/584 |
| 4,009,525 | 3/1977 | Hollander | 35/22 |
| 4,227,458 | 10/1980 | Kapoor | 101/350 |
| 4,279,883 | 7/1981 | Izumi et al. | 423/584 |
| 4,335,092 | 6/1982 | Dalton, Jr. et al. | 423/584 |
| 4,772,458 | 9/1988 | Gosser et al. | 423/584 |
| 4,899,705 | 2/1990 | Reed | 123/197 |
| 4,912,072 | 3/1990 | Mallouk et al. | 502/74 |
| 5,102,839 | 4/1992 | Borghard et al. | 502/74 |
| 5,135,731 | 8/1992 | Gosser et al. | 423/584 |
| 5,374,339 | 12/1994 | Guillet et al. | 423/584 |
| 5,480,629 | 1/1996 | Thompson et al. | 423/584 |
| 5,624,543 | 4/1997 | Guillet et al. | 423/584 |
| 5,785,943 | 7/1998 | Guillet et al. | 423/584 |

OTHER PUBLICATIONS

Reis et al., *J. Catal.*, vol. 161, pp. 62–67 (1996).

*Primary Examiner*—Wayne Langel
*Attorney, Agent, or Firm*—Funnegan, Henderson, Farabow, Garrett, and Dunner. L.L.P.

[57] ABSTRACT

The invention herein relates to a direct manufacturing method of hydrogen peroxide over zeolite, wherein transition metals such as palladium or platinum, and organic compounds such as 2-alkyl anthraquinone or the like are encapsulated onto the zeolite channels, and then reducing agents such as hydrogen, ammonia or alcohol are used in the reaction temperature range of 10~90° C. under atmospheric pressure. In general, alkyl anthiraquinone used in the conventional manufacturing, method of hydrogen peroxide can be easily hydrogenated in a relatively mild temperature condition in the range of room temperature to 100° C. by means of a compound having hydrogen. However, the use of alkyl anthraquinone in the reaction is problematic due to the fact that it can only be utilized in a working solution with a solvent which can effectively dissolve alkyl anthraquinoe. The invention herein provides a method of directly manufacturing hydrogen peroxide in aqueous solution, which can overcome the problems of the conventional methods, wherein the compounds which can transfer hydrogen such as alkyl anthraquinone or the like are encapsulated onto the zeolite pores.

7 Claims, No Drawings

DIRECT MANUFACTURING METHOD OF HYDROGEN PEROXIDE

BACKGROUND OF THE INVENTION

1. Field of the Invention

The invention herein relates to a direct manufacturing method of hydrogen peroxide in aqueous solution, wherein transition metals in Group VIII including palladium or platinum, and organic compounds such as alkyl anthraquinone, anthraquinone-2-carbonylic acid or the like, 1,2-diphenylhydrdzine and azobenzene are encapsulated onto the zeolite channels, and then reducing agents such as hydrogen, ammonia or hydrogen sulfide in addition to oxygen are simultaneously supplied therein in a range of 10~90° C. and at an atmosphere.

2. Description of the Prior Art

Based on the continuous research and development of the manufacturing method of hydrogen peroxide, a mass production of hydrogen peroxide is now possible. Almost every sector of the industry is utilizing hydrogen peroxide, and the trend is that its application will be expanded even more. The usefulness of hydrogen peroxide is based mainly on its oxidation property though it is also used in substitution and degradation reactions. As for the application range of hydrogen peroxide, one of the most applicable area is its use as bleacher. Hydrogen peroxide is degraded into water after use, and in this regard, there is no pollution problem. Due to its environmentally-friendly characteristics, the trend is that its use in the fields of water treatment, chemical industry and environment protection sector will increase. In particular, if hydrogen peroxide is used in waste water treatment, there is an advantage in that BOD, COD, color and order can be effectively reduced. It is also used in expoxidation, hydroxylation, oxidation, and initialization of polymerization in addition to its role as supplier of oxygen in a variety of organic chemical industrial sectors.

Hydrogen peroxide has been commercially manufactured by means of the Riedl-Pfeiderer process or AO process which were developed during the late 1940's to early 1950's. AO process consists of two-step processes in which the first step comprises a conversion process of alkyl anthraquinone into alkyl anthrahydroquinone. The second step comprises a process of oxidation of alkyl hydroquinone by oxygen for the purpose of manufacturing hydrogen peroxide. In the AO process, within a carrier solvent commonly called a working solution, alkylanthraquinone and alkyl anthrahydroquinone alternately become reduced and oxidized, thereby producing hydrogen peroxide.

Based on the research into the topic of the manufacture of hydrogen peroxide the effects of the type of anthraquinones, the composition of and change in a working solution, type of catalysts, and quinone compounds on the manufacture of hydrogen peroxide have been duly disclosed. The catalyst used in the manufacturing process is prepared by impregnating palladium or nickel into a stable carrier, and hydrogen peroxide is extracted by using water. Consequently, hydrogen peroxide in solution always contains organic solvents as impurities, which in return requires a further refining process. Furthermore, the disadvantage of the AO process lies in the complicated and expensive manufacturing process wherein the loss of alkyl anithraquinone is caused by deterioration in the activity of the hydrolyzed catalyst. As such, the non-homogeneous catalyst which can be used in solution for the purpose of producing hydrogen peroxide is deemed necessary.

The method of directly manufacturing hydrogen peroxide from hydrogen and oxygen has been tried, without the use of organic solvents which had been used as working solution due to its favorable environmental and economical considerations. While the conventional production method of hydrogen peroxide uses a homogeneous catalyst in working solution, the direct method is characterized by the use of a non-homogeneous catalyst in aqueous solution. The method of manufacturing hydrogen peroxide by means of using hydrogen and oxygen under the non-homogeneous catalyst has been reported in U.S. Pat. No. 4,899,705 (1989) and U.S. Pat. No. 5,135,731 (1992). In U.S. Pat. No. 4,227,458, granted to Du Pont of USA as assignee, after impregnating palladium into a carbon carrier, hydrogen at atmospheric pressure of 25 and oxygen at atmospheric pressure of 140 were infused into a pressurized reactor in an acidic condition by means of reaction promotors such as bromine and chorine compounds, and then the reaction therein was carried out for 3 hours at room temperature. At that point, the concentration of hydrogen peroxide so prepared was 12.6 wgt %, and the selectivity for hydrogen peroxide was 66%. The non-homogeneous catalyst for directly manufacturing hydrogen peroxide from hydrogen and oxygen was prepared by means of impregnating a transitional metal in Group VIII into a stable supports.

However, in the manufacturing process of hydrogen peroxide at an industrially usable concentration, there is a danger with respect to handling hydrogen and oxygen since they must be injected at high pressure. Therefore, the aforementioned process has yet to be commercialized. In order to commercialize the aforementioned manufacturing method of hydrogen peroxide, several key problematic points must be solved: i.e., low concentration of manufactured hydrogen peroxide, low selectivity for hydrogen peroxide with respect to consumed hydrogen, slow reaction rate and oxygen-only reaction condition. Furthers the characteristic of the aforementioned process is that hydrogen peroxide is manufactured in an acidic aqueous medium.

U.S. Pat. No. 4,009,252 granted to Izu et al. discloses a method of producing hydrogen peroxide in the amount of 9–12 wgt % in acidic environment (1 g of hydrochloric acid, 49 g of sulfuric acid) by using a catalyst in which palladium has been precipitated in silicic acid. There, the mole ratio between oxygen and hydrogen injected into the reaction was 1.5~20, and the selectivity af hydrogen peroxide with respect to hydrogen was relatively high at 80~89%. The reaction rate was rather slow at 1 or less. From the process, 6 g of hydrogen peroxide was produced per 1 liter of aqueous solution. In U.S. Pat. No. 4,772,458 granted to Gosser et al., hydrogen peroxide at a high concentration and reaction rate was obtained in a low acidic condition by using a catalyst in which the metals were impregnated into a variety of carriers although the process was deemed quite dangerous. When a bromide ion was used in the reaction, the selectivity was 30–70%. When a chloride ion was used, the selectivity was low at 6%. When the ratio of $\frac{1}{10}$ was used for platinum to palladium in the alumina carrier during the manufacture of hydrogen peroxide, the concentration of hydrogen peroxide was 17.8%. In U.S. Pat. No. 5,374,339 granted to Guillet and Friedman discloses a method of manufacturing hydrogen peroxide by means of impregnating anthraquinone onto an undissolved solid. The catalyst used a hydrogen transfer organic substance such as alcohol to reduce the impregnated anthraquinone. Then, hydrogen peroxide was produced when the oxidation reaction by oxygen was carried out. There, the reaction was a light reaction based on light, and anthraquinone was recycled into the original form after oxidation therein.

Further, U.S. Pat. No. 5,480,629 granted to Thompson et al. teaches a method of manufacturing hydrogen peroxide via light in the presence of hydrogen and oxygen by means of using lamellar compounds which have been encapsulated with chelated metals. During the manufacturing of hydrogen peroxide, the ends of the lamellar compounds which were encapsulated with the chelated metals consist of phosphate and arsenate. These end portions were divalent electron receptors. The lamellar portions were divided by a vertical alignment layer of $IV_A$, $IV_B$, $III_A$ and $III_B$, and the non-valent transitional metals in Group VIII were encapsulated into the chelated layer. The aforementioned chelated substance is a catalyst for manufacturing hydroden peroxide from hydrogen and oxygen and is very useful for converting and storing solar energy.

Based on the metals which are impregnated into the catalyst or hydrogen carrier, the hydrogen peroxide so produced can be compared in terms of turnover frequency. The turnover frequency as below is a turnover number of hydrogen peroxide produced from 1 liter of solution during 1 hour by a catalyst based oil transitional metals or hydrogen carriers in 1 g of a catalyst. According to the recently reported journal by Thomson (J. Catal., 161, 62 (1996)), the turnover frequency with respect to hydrogen peroxide was disclosed as 13. There, the oxygen injected as a static condition had atmospheric pressure of 1, and oxygen had atmospheric pressure of 7. after which the reaction was carried out for 1 hour. In the aforementioned U.S. Pat. No. 4,009,525, hydrogen with atmospheric pressure of 0.29 and oxygen with 0.71 atmospheric pressure were injected as a static condition for reaction in order to produce hydrogen peroxide. There, the turnover frequency of palladium with respect to hydrogen peroxide as calculated was determined to be 4,400, which suggests a is relatively high activity. However, in U.S. Pat. No. 4,279,883, in which hydrogen peroxide is manufactured by means of injecting continual pressurized hydrogen and oxygen, the turnover frequency of palladium was 22, which was lower than that in the manufacturing method hydrogen peroxide in a static condition. The low turnover frequency of palladium was also observed in U.S. Pat. No. 4,335,092 granted to Air Product as assignee, in which a reaction was carried out by continuously injecting hydrogen and oxygen.

The methods for encapsulating organic compounds into the zcolite pores include flexible ligand route, template synthesis route and zeolite synthesis route. In the flexible liganid route method, chelated metals are first ion-exchanged, and the chelated metals larger than the size of the zeolite pores are encapsulated by means of expanding relatively flexible ligands. In the template synthesis route, the chelated metals smaller than the size of the zeolite pores are encapsulated by means of expanding the ligands into the pores in order to substitute the ligands with those already in place. The zeolite synthesis route is a method of encapsulating by adding chelated metals during the synthesis of zeolite. In the invention herein, the catalyst was manufactured by application of the flexible ligand route method.

The measurement methods of the hydrogen peroxide concentration include various titration methods such as a $KMnO_4$ method, cerium method and iodometry a gasometric method which measures the amount of oxygen gas generated when $H_2O_2$ is distributed, and a calorimetric method using a spectrocolorimeter. Among these methods, the most widely used and accurate method is a titration method using the reduction and oxidation reactions of hydrogen peroxide. In particular, the $KMnO_4$ method and cerium methods are mainly used. In the $KMnO_4$ method, the concentration of hydrogen peroxide can be most accurately measured given that the inorganic or organic substances which react with hydrogen peroxide ions are absent. The cerium method can be used instead of the $KMnO_4$ method when organic or chloride substances are present which can react with $MnO_4$. In the present invention, the $KMnO_4$ method was used to measure the amount of hydrogen peroxide since organic or chloride substances do not exist in the reaction system.

SUMMARY OF THE INVENTION

The invention relates to a direct manufacturing method of hydrogen peroxide in aqueous solution wherein transition metals in Group Vlll including palladium or platinum, and organic compounds such as alkyl anthraquinone, anthraquinone-2-carbonylic acid or the like, 1,2-diphenyllhydrazine and azobenzene are encapsulated onto the zeolite channels, and then reducing agents such as hydrogen, ammonia or hydrogen sulfide in addition to oxygen are simultaneously infused therein in a range of 10~90° C. and at an atmosphere.

DETAILED DESCRIPTION OF THE INVENTION

With respect to the method of directly manufacturing hydrogen peroxide over zeolite, the invention herein comprises a process of encapsulating the transition metals in Group VIII and hydrogen carrier compounds into the zeolite channels, a process of hydrogenating the encapsulated compounds by means of using the reducing agent at the reaction temperature range of 10~90° C.; and a process of oxidation by oxygen gas.

The inventors herein devised a method of directly manufacturing hydrogen peroxide over zeolite, wherein transition metals including palladium or platinum, and organic compounds such as 2-alkyl anthraquinone or the like are encapsulated into the zeolite channels, and then the encapsulated compounds are hydrogenated by means of using reducing agents such as hydrogen, ammonia or alcohol in the reaction temperature range of 10~90° C., followed by oxidation by oxygen gas. The conventional alkyl anthraquinone can be relatively easily hydrogenated by a substance containing hydrogen in the range of room temperature to 100° C. However, the hydrogenation can only occur in a working solution containing solvents which can dissolve quinone and hydroquinone. In the present invention, alkyl anthraquinone and the like, which can transfer hydrogen, are encapsulated into the zeolite pores in order to directly manufacture hydrogen peroxide in aqueous solution. As such, the invention herein has been devised with the objective of overcoming many of the shortcomings of the previous method of manufacturing hydrogen peroxide.

With respect to the manufacture of a catalyst, in the first step, the transition metals were ion-exchanged by means of stirring for 12 hours at 60° C. by using a $M(NH_3)_4Cl_2$ (M=Pd, Pt) solution onto zeolite Y, MCM-41, or Beta. Then, it was sufficiently washed using distilled water until the remaining $M(NH_3)_4Cl_2$ was no loner detected, after which was calcined at 550° C. having increased the temperature at 1° C./min. For the second step, in order to produce non-valent transition metals under calcined zeolite, which can activate the reducing agents including hydrogen, the aforementioned transition metals were reduced by treating the same with hydrogen for 6 hours at 300° C. For the third step, after adding a certain amount of dehydrated zeolite, an organic solution with dissolved 0.01~0.5M of hydrogen carrier was prepared and stirred for 3 days at 60° C. For removing hydrogen carrier physically adsorbed onto the surface of the catalyst, organic solvents such as benzene or acetone were used to wash the catalyst by Soxhlet extractor. Thereafter, the catalyst with the encapsulated hydrogen carrier was manufactured by drying the same for 24 hours at a temperature of 10° C. below the decomposition point of the hydrogen carrier.

The zeolite carrier used in the production of a catalyst for direct manufacturing of hydrogen peroxide had a relatively large pore inlet, i.e., Y, Beta, L or MCM-41, and the Si/Al ratio therein was determined to be 1~160. The type of a cation in the zeolite Was Na, K or H.

The encapsulated compounds used as hydrogen carrier in the reaction of the direct manufacturing method of hydrogen peroxide include 2-alkyl anthraquinone(alkyl=ethyl, buthyl, amyl), anthraqiompme-2-carboxylic acid, anthrequinone-1,5-disulfonec disodium salt hydrate, anthrafalvic acid, azobenzene, phenanzine, quinone and phenathrene.

The transition metals used in the hdrogen activation in the reaction of the direct manufacturing method of hydrogen peroxide include Pd, Pt, Rh, Ir and Fe.

The reducing agents used in the hydrogen activation in the reaction of the direct manufacturing method of hydrogen peroxide include hydrogen, ammonia and alcohol.

In the reaction of the direct manufacturing method of hydrogen peroxide, water was used as solvent, and the zeolite in which the cation is not of H type was reacted with sulfuric acid.

A reflux condenser, injection equipment for hydrogen and oxygen gas, and a three-neck round bottom flask reactor with sampling inlets were used as manufacturing equipment of hydrogen peroxide in order to measure the reaction activity of the prepared catalyst. First, water and 0.1N of acid in a 3:1 weight ratio were mixed, and 1 liter thereof was added to the reactor, followed by adding of 1 g of a catalyst. The reaction temperature was raised to 60° C., and the reaction was carried out as 20 ml of hydrogen and 10 ml of oxygen per minute were injected to the reactor simultaneously. In the case where the cation of a catalyst was of H type, an acid such as sulfuric, acetic or chloric acids was not added. In the case where the catalyst was of Na or K type, an acid such as sulfuric acid was added for reaction. After the reaction, a filter was used to separate and remove the catalyst, and the amount of hydrogen peroxide production in the filtrate was determined with the standard $KMnO_4$ solution.

The invention herein provides a method of directly manufacturing hydrogen peroxide in solution, which overcomes the shortcomings of the conventional production method, wherein carrier compounds capable of transferring hydrogen such as alkyl anthraquinone and the like are encapsulated onto the zeolite pores.

EXAMPLES 1~3

In the examples herein, palladium was impregnated onto various types of zeolites (NaY, Na-Beta, MCM-41), and 2-ethyl anthraquinone was encapsulated therein. The catalyst so prepared was used in the reaction for manufacturing hydrogen peroxide. In particular, the catalyst was manufactured by ion-exchanging the palladium in order to homogeneously disperse the non-valent palladium, followed by a calcination by means of raising the temperature at 1° C. per minute. Then the calcined sample was reduced by hydrogen. After removing the water, it was added to a solution containing a hydrogen carrier, after which was stirred for 3 hours. Finally, the catalyst was washed with various types of solvents and then dried. The results of the reactions for manufacturing hydrogen peroxide are shown in Table 1.

The activity for hydrogen peroxide as shown in the table is indicated by the turnover frequency of the encapsulated organic substance. In other words, the turnover frequency as shown is a turnover number of hydrogen peroxide which was produced by means of a catalyst in 1 liter of solution during 1 hour with the standard of hydrogen carriers contained in 1 g of a catalyst.

In order to measure the reaction activity of a catalyst, the catalyst of Example 1 and waster as solvent were placed in a reactor, and the reaction was carried out as oxygen and hydrogen were simultaneously injected therein at 60° C. for 1 hour. At this point, sulfuric acid was added to the solvent.

The catalysts used in Example 1~3 were obtained by impregnating and encapsulating palladium and ethyl anthraquinone onto various types of zeolites according to the channel type, pore size and Si/Al ratio. The turnover frequency of the aforementioned catalysts during the reactions for the manufacture of hydrogen peroxide are shown in Table 1. As shown in Table 1, the Y zeolite having a three-dimensional channel structure had a significantly higher catalytic activity as compared to ones having a straight-line channel structure. Further, the turnover frequency of the catalyst for ethyl anthraquinone in the case of Comparative Example 1 where only anthraquinone was present was 43, which is a relatively high production amount of hydrogen peroxide. In the case where only palladium was present in the carriers not shown in Table 1, the production amount of hydrogen peroxide showed a very low activity at the level of 1/10 of that of Example 1.

The catalyst of Example 1 was a catalyst having both palladium and anthraquinone and had a very high turnover frequency of ethyl anthraquinone of 109.

As for the catalyst of Example 2, the carrier of Example 1 had been substituted with Na-Beta, and the manufacturing method thereof was same as that of Example 1.

In Example 3, the catalyst was manufactured using the same method of Example 1 with the exception of a MCM-41 zeolite carrier with a relatively large pore structure. With the application of the catalyst in the reactions for manufacturing hydrogen peroxide, the turnover frequency of ethyl anthraquinone with respect to hydrogen peroxide was 74, which suggests a relatively large production amount of hydrogen peroxide.

EXAMPLE 4~6

Example 4 utilized a similar catalyst and reaction system as compared to Example 1. The catalyst used herein was ion-exchanged into H type before ion-exchanging the palladium. Other than the aforementioned factor, the same method as in Example 1 was used with respect to the catalyst. Although sulfuric acid was added Example 1, the reaction herein was carried out without sulfuric acid in Examples 4~6 wherein cations were of 1 type.

With respect to the reaction activity based on the type of zcolite the turnover frequency of a Y zeolite having a three-dimensional channel structure as in Examples 1~3 was the highest at 163. Further, the turnover frequency of ethyl antraquinone with respect to hydrogen peroxide for Examples 5 and 6 were, respectively, 62 and 39, which suggests an advantage for the zeolite which has been ion-exchanged into H type during the manufacture of hydrogen peroxide.

COMPARATIVE EXAMPLE 1

In order to compare with Examples 1~3 the NaY was impregnated with anthraquinone for reaction, and the reaction results therein are shown in Table 1.

COMPARATIVE EXAMPLE 2

In order to compare with Examples 4~6, the EIY zeolite with the highest activity was encapsulated with anthraquinone for reaction, and the reaction results therein are shown in Table 1. In general, when the cations of the zeolite was ion-exchanged into H type, the production amount of hydrogen peroxide was increased.

TABLE 1

Reaction Results for the Production of Hydrogen Peroxide Using a Catalyst in which 2-ethyl Anthraquinone and Palladium are Encapsulated onto the Zeolite Channel

| No. | Catalyst | Turnover Frequency** |
|---|---|---|
| Example 1 | 2-EAQ*/Pd/NaY | 109 |
| Example 2 | 2-EAQ*/Pd/NaBeta | 58 |
| Example 3 | 2-EAQ*/Pd/MCM-41 | 74 |
| Example 4 | 2-EAQ*/Pd/HY | 163 |
| Example 5 | 2-EAQ*/Pd/H-Beta | 62 |
| Example 6 | 2-EAQ*/Pd/HL | 39 |
| Comparative Example 1 | 2-EAQ*/NaY | 43 |
| Comparative Example 2 | 2-EAQ*/HY | 52 |

*2-EAQ: 2-ethyl anthraquinone
**Number of molecules of hydrogen peroxide produced during 1 second in 1 liter of aqueous solution from one molecule of 2-EAQ

EXAMPLES 7~10

In Example 7, onto the HY zeolite impregnated with palladium under the same method of Example 1, anthrequinone-2-carboxylic acid was encapsulated by organic solvent. Based on the same reaction of Example 4–6, the turnover frequency was determined to be 132.

In Example 8, the catalyst was prepared by reducing the same after ion-exchanging the platinum instead of palladium onto the HY. Then, anthrequinone-5-disulfonic disodium salt hydrate was encapsulated therein for reaction. There, the turnover frequency was determined to be 121.

In Examples 9 and 10, onto the catalyst of Example 7, anthreflavic acid and azobenzene were encapsulated instead of anthrequinone-2-carboxylic acid. The turnover frequency of Examples 9 and 10 were 76 and 5 1, respectively.

COMPARATIVE EXAMPLES 3~6

In order to compare with Examples 7~10, a catalyst was prepared without transition metals and applied to the reaction for the manufacture of hydrogen peroxide, and the reaction results therein are shown in Table 2.

TABLE 2

Reaction Results for the Production of Hydrogen Peroxide Using a Catalyst in which Hydrogen Carrier and Transitional Metals are Encapsulated onto the Zeolite Channel

| No. | Catalyst | Turnover Frequency** |
|---|---|---|
| Example 7 | AQC*/Pd/HY | 132 |
| Example 8 | AQD*/Pt/HY | 121 |
| Example 9 | AFA*/Pd/HY | 76 |
| Example 10 | AB*/Pd/HY | 51 |
| Comparative Example 3 | AQC*/HY | 45 |
| Comparative Example 4 | AQD*/HY | 36 |
| Comparative Example 5 | AFA*/HY | 28 |
| Comparative Example 6 | AB*/HY | 25 |

*AQC: Anthraquinone-2carboxylic acid
AQD: Anthraquinone-1,5-disulfonic disodium salt hydrate
AFA: Anthraflavic acid
AB: Azobenzene Phenanzine
**Number of molecules of hydrogen peroxide produced during 1 second in 1 liter of aqueous solution from one molecule of 2-EAQ

What is claimed is:

1. A method of manufacturing hydrogen peroxide over zeolite, which comprises the steps of:
    (a) encapsulating one or more transition metals of Group VIII of the Periodic Table and hydrogen carrier compounds on the zeolite channels; and
    (b) supplying hydrogen and oxygen simultaneously at a reaction temperature of 10–90° C.

2. A method of manufacturing hydrogen peroxide according to claim 1, wherein said transition metal is selected from the group consisting of palladium, platinum, rhodium, iridium and iron.

3. A method of manufacturing hydrogen peroxide according to claim 1, wherein said hydrogen carrier is selected from the group consisting of 2-methyl anthraquinone, 2-butyl anthraquinone, 2-amyl anthraquinone, anthraquinone-2-carboxylic acid, disodium anthraquinone-1,5-disulfonic acid, anthraflavic acid, azobenzene, phenanizine, quinone and phenanthrene.

4. A method of manufacturing hydrogen peroxide according to claim 1, wherein said zeolite is Y, Beta, L or MCM-41.

5. A method of manufacturing hydrogen peroxide according to claim 4, wherein the Si/Al ratio of the zeolite is 1~160.

6. A method of manufacturing hydrogen peroxide according to claim 4, wherein the zeolite comprises Na, K, or H ions.

7. A method of manufacturing hydrogen peroxide according to claim 1, wherein water is used as solvent in step (b) of claim 1.

* * * * *